United States Patent
Ramanathan et al.

(10) Patent No.: US 10,805,829 B2
(45) Date of Patent: Oct. 13, 2020

(54) BLE-BASED LOCATION SERVICES IN HIGH DENSITY DEPLOYMENTS

(71) Applicant: Cisco Technology, Inc., San Jose, CA (US)

(72) Inventors: Shankar Ramanathan, Richardson, TX (US); Gonzalo Salgueiro, Raleigh, NC (US); Robert Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 16/270,640

(22) Filed: Feb. 8, 2019

(65) Prior Publication Data

US 2020/0260320 A1 Aug. 13, 2020

(51) Int. Cl.
*H04W 28/02* (2009.01)
*H04W 4/02* (2018.01)
*H04W 72/12* (2009.01)
*H04W 4/80* (2018.01)

(52) U.S. Cl.
CPC ......... *H04W 28/0284* (2013.01); *H04W 4/02* (2013.01); *H04W 4/80* (2018.02); *H04W 72/121* (2013.01); *H04W 72/1252* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 9,900,745 B2* | 2/2018 | Bjorkengren | H04W 48/16 |
| 9,961,507 B1* | 5/2018 | Mendelson | H04W 48/10 |
| 9,998,903 B2* | 6/2018 | Krishnakumar | H04W 8/005 |
| 2005/0272472 A1 | 12/2005 | Goldberg et al. | |
| 2011/0050732 A1* | 3/2011 | Arrasvuori | G06F 16/29 345/666 |
| 2011/0121963 A1* | 5/2011 | Prehofer | G01C 21/30 340/539.13 |
| 2011/0125744 A1* | 5/2011 | Immonen | G06F 16/29 707/737 |

(Continued)

OTHER PUBLICATIONS

"A BLE Advertising Primer", Online: http://www.argenox.com/a-ble-advertising-primer/, 2018, printed Jan. 25, 2019, 14 pages, Argenox Technologies.

(Continued)

*Primary Examiner* — Bunjob Jaroenchonwanit
(74) *Attorney, Agent, or Firm* — Behmke Innovation Group LLC; Kenneth J. Heywood; Jonathon P. Western (57) ABSTRACT

In one embodiment, a device obtains telemetry data indicative of channel usage by a plurality of Bluetooth Low Energy (BLE) tags. The device also obtains tag characteristic data indicative of one or more characteristics of the BLE tags. The device determines that usage of a particular channel by the BLE tags exceeds a predefined threshold, based on the obtained telemetry data. The device selects a subset of the plurality of BLE tags, based on their one or more characteristics indicated by the obtained tag characteristic data. The device instructs, for each of the selected subset of BLE tags, the selected BLE tag to increase an interval of time between BLE advertisements sent by the selected BLE tag.

20 Claims, 7 Drawing Sheets

(56) References Cited

U.S. PATENT DOCUMENTS

| | | | |
|---|---|---|---|
| 2012/0136865 A1* | 5/2012 | Blom | G06F 16/29 |
| | | | 707/739 |
| 2016/0021650 A1 | 1/2016 | Chembil-Palat et al. | |
| 2017/0223483 A1* | 8/2017 | Granbery | H04L 67/18 |
| 2018/0060891 A1* | 3/2018 | Von Cavallar | G06Q 10/067 |
| 2018/0183551 A1* | 6/2018 | Chou | H04L 5/001 |
| 2018/0199343 A1* | 7/2018 | Deogun | H04L 5/0044 |
| 2018/0290687 A1* | 10/2018 | Douglas | H04W 4/023 |
| 2019/0043002 A1* | 2/2019 | King | G07C 9/00174 |
| 2019/0090299 A1* | 3/2019 | Ang | H04L 5/0053 |
| 2019/0103953 A1* | 4/2019 | Liao | H04L 5/0042 |
| 2019/0132793 A1* | 5/2019 | Lin | H04W 52/0206 |
| 2019/0140881 A1* | 5/2019 | Akkarakaran | H04L 27/2657 |
| 2019/0149380 A1* | 5/2019 | Babaei | H04W 72/044 |
| | | | 370/330 |
| 2019/0158229 A1* | 5/2019 | Wei | H04W 76/28 |
| 2019/0166066 A1* | 5/2019 | Ang | H04L 5/1469 |
| 2019/0166529 A1* | 5/2019 | Chen | H04W 74/006 |
| 2019/0166555 A1* | 5/2019 | Cheng | H04W 72/14 |
| 2019/0182000 A1* | 6/2019 | Futaki | H04L 5/005 |
| 2019/0191399 A1* | 6/2019 | Islam | H04W 56/005 |
| 2019/0199592 A1* | 6/2019 | Lin | H04L 5/0098 |
| 2019/0208548 A1* | 7/2019 | Shih | H04L 5/0051 |
| 2019/0215861 A1* | 7/2019 | Son | H04W 56/0045 |
| 2019/0215871 A1* | 7/2019 | Aiba | H04W 74/0833 |
| 2019/0215888 A1* | 7/2019 | Cirik | H04B 7/0695 |
| 2019/0215896 A1* | 7/2019 | Zhou | H04B 7/0626 |
| 2019/0222404 A1* | 7/2019 | Ang | H04L 5/0098 |
| 2019/0258407 A1* | 8/2019 | Buzzard | G06F 3/067 |
| 2019/0268910 A1* | 8/2019 | Chen | H04L 5/0064 |
| 2019/0349963 A1* | 11/2019 | Abdoli | H04W 72/0453 |
| 2019/0364602 A1* | 11/2019 | Yi | H04W 74/0833 |
| 2020/0037260 A1* | 1/2020 | Fu | H04W 52/325 |
| 2020/0059345 A1* | 2/2020 | Pelletier | H04L 1/1657 |
| 2020/0059390 A1* | 2/2020 | Zhang | H04W 72/14 |
| 2020/0119895 A1* | 4/2020 | Choi | H04L 5/00 |
| 2020/0137563 A1* | 4/2020 | Bhattacharyya | H04W 12/009 |
| 2020/0145936 A1* | 5/2020 | Lee | H04W 52/42 |

OTHER PUBLICATIONS

Kravets, et al., "Beacon Trains: Blazing a Trail through Dense BLE Environments", CHANTS'16, Oct. 3-7, 2016, New York City, NY, USA., pp. 69-74, 2016, ACM.

Lazik, et al., "ALPS: A Bluetooth and Ultrasound Platform for Mapping and Localization", SenSys'15, Nov. 1-4, 2015, Seoul, South Korea., pp. 73-84, 2015, ACM.

* cited by examiner

BLE-BASED LOCATION SERVICES IN HIGH DENSITY DEPLOYMENTS

TECHNICAL FIELD

The present disclosure relates generally to computer networks, and, more particularly, to Bluetooth Low Energy (BLE)-based location services in high density deployments.

BACKGROUND

In general, location services refer to a collection of network technologies that seek to determine, and potentially track, the physical location(s) of a device via a computer network. For example, mobile phone tracking is one example of location services that typically uses the triangulation of signals received from a phone by multiple cell towers to determine the physical location of the phone. This location information can be used for multiple purposes, such as forwarding the location to an emergency responder, for purposes of navigation, and the like.

One technology that can be used for location services is Bluetooth Low Energy (BLE) that was specifically designed to consume less energy than other wireless technologies. Despite this advantage, BLE beacons also operate in the congested 2.4 GHz band. Moreover, the channels used by BLE are industrial, scientific, and medical (ISM) channels, meaning that BLE tags compete with multiple systems, including Wi-Fi, as soon as they establish a connection. Prior to establishing a connection, BLE uses three "Wi-Fi friendly" advertisement channels, to avoid collision with Wi-Fi channels. With such limited channel availability for advertisements, as little as five BLE tags are enough to create collisions with one another. When used for purposes of location services in high density environments, which may include upwards of tens of thousands of BLE tags, this all but guarantees a very high rate of collisions, making it all but impossible for the location services to track every tag.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains telemetry data indicative of channel usage by a plurality of Bluetooth Low Energy (BLE) tags. The device also obtains tag characteristic data indicative of one or more characteristics of the BLE tags. The device determines that usage of a particular channel by the BLE tags exceeds a predefined threshold, based on the obtained telemetry data. The device selects a subset of the plurality of BLE tags, based on their one or more characteristics indicated by the obtained tag characteristic data. The device instructs, for each of the selected subset of BLE tags, the selected BLE tag to increase an interval of time between BLE advertisements sent by the selected BLE tag.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
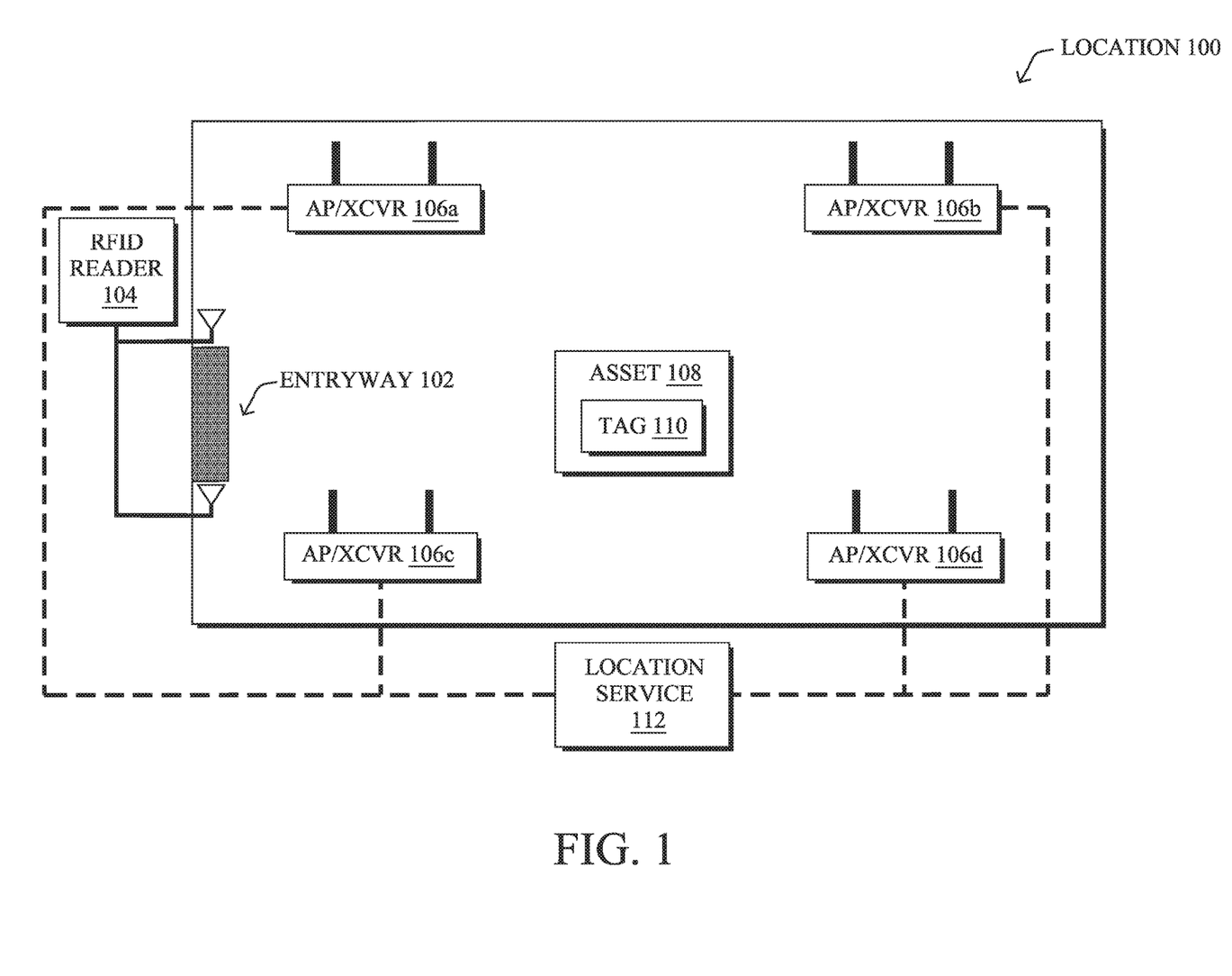
FIG. 1 illustrate an example communication network.

FIG. 1 is a schematic block diagram of an example computer network 100 illustratively comprising nodes/devices, such as a locator tag 104 and various networking devices, as shown. For example, network 100 may comprise any number of wireless access points (APs)/transceivers (XCVRs) 106 that are distributed throughout a physical location 104, such as a room or collection of rooms, floor or set of floors, building, or the like. In various embodiments, network 100 may be configured to determine and track the physical location of locator tag 110 within location 104. For example, location 104 may be a room having one or more entryways 102 and network 100 may be configured to identify whether locator tag 110/asset 108 is located within the room at any given point in time.

In some implementations, locator tag 110 may be a separate electronic device that may be affixed or otherwise attached to an asset 108 that is to be located and tracked via network 100. As would be appreciated, asset 108 may be any form of electronic or non-electronic object that is to be located within location 104. For example, asset 108 may be a component, piece of industrial equipment, or finished product in an industrial setting. In another example, asset 108 may be a piece of medical equipment, drug, or the like, in a medical setting.

In further implementations, the functionalities described herein with respect to locator tag 110 may be integrated into asset 108, if asset 108 is an electronic device with the capacity to perform these functions. For example, a laptop computer, mobile phone or other mobile device, or the like, may already have existing hardware to support the functions described herein with respect to locator tag 110. In such cases, asset 108 may then implement these functions through the use of specialized software downloaded to the device.

During operation, tag 110 may communicate with one or more of APs/XCVRs 106 (e.g., any or all of APs 106a-106d in location 104). Based on these communications, a location service 112 in network 100 may determine the physical location of tag 110 and, consequently, the location of asset 108, allowing asset 108 to be located and tracked within location 104. In general, such a locating mechanism may take into account any or all of the following, to determine the location of asset 108:

Which of APs 106 received one or more transmissions from locator tag 110.

The signal strength of the received transmission(s).

The prior location(s) of locator tag 110/asset 108.

Distance, for example, between a given AP 106 and tag 110 may be a function of the signal strength of the transmission from tag 110. Similarly, if the transmission is received by multiple APs 106, triangulation or another location estimation technique can be used by location service 112 to correlate the transmissions and determine a physical location of tag 110/asset 108 within location 104.

In various embodiments, APs 106 may comprise one or more wireless transmitters or transceivers, to send location beacons to, and/or receive from, locator tag 110/asset 108. Examples of such beacons may include, but are not limited to, any or all of the following:

Radio Frequency (RF) beacons such as:
Wi-Fi beacons
Bluetooth Low Energy (BLE)
Ultrasound beacons
Infrared (IR) beacons For simplicity, APs 106 are show and described herein as supporting multiple types of beacons and communication technologies. However, in further embodiments, these may be implemented across multiple devices. For example, network 100 may comprise any number of ultrasound receivers, IR receivers, and/or RF receivers that may or may not be part of APs 106, in some embodiments.

Figure 2:
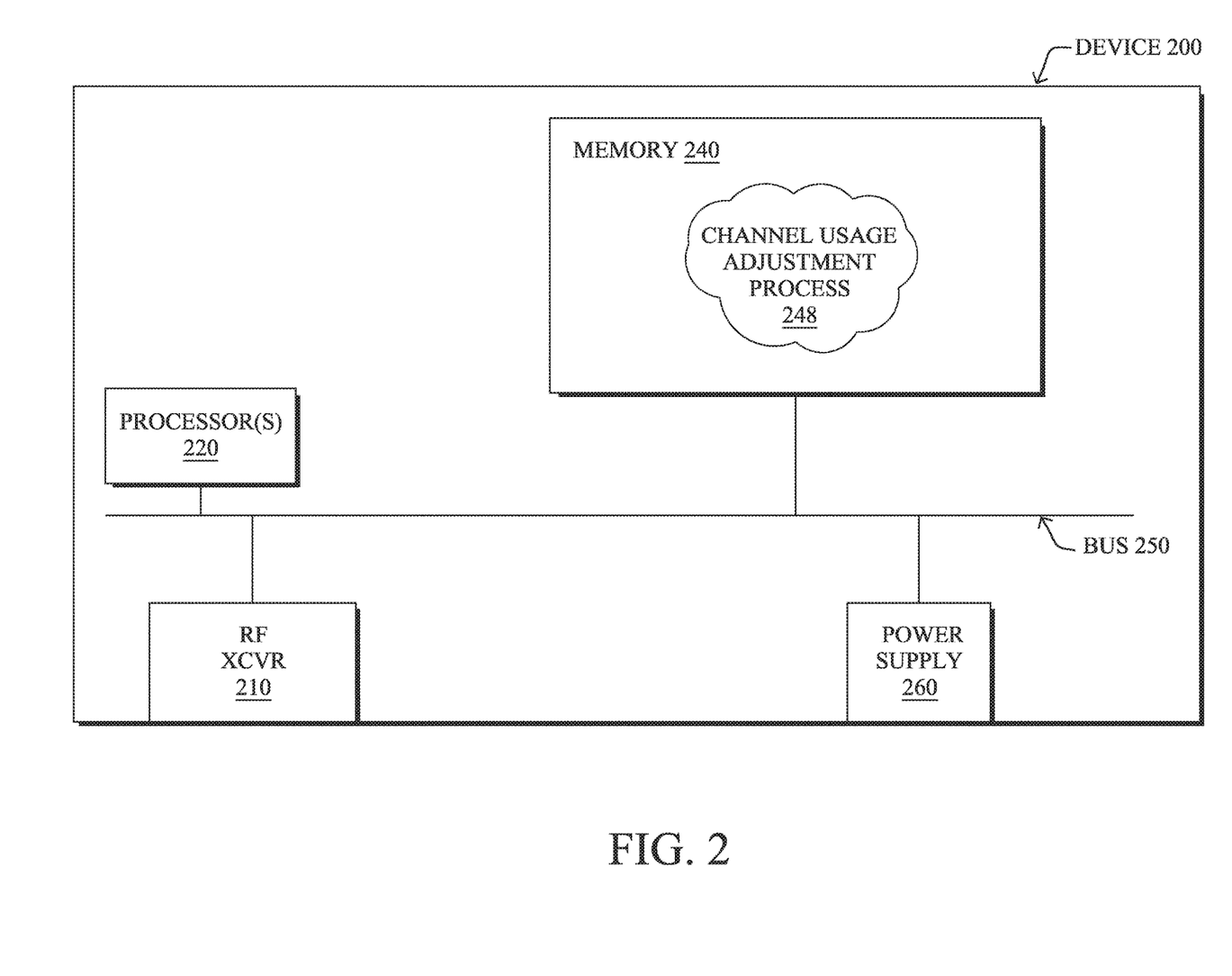
FIG. 2 illustrates an example network device/node.

FIG. 2 is a schematic block diagram of an example node/device 200 that may be used with one or more embodiments described herein, e.g., as any of the computing devices shown in FIG. 1, particularly tag 110, AP 106, location service 112, any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more interfaces 210/215, one or more processors 220, and a memory 240 interconnected by a system bus 250 and is powered by a power supply 260 (e.g., a hardwired power supply, a battery or other charge storage mechanism, etc.).

As shown, device 200 may include at least one RF transceiver (XCVR) 210 configured to receive and/or transmit RF-based communications, such as Wi-Fi, Bluetooth (e.g., BLE, etc.), or the like.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures. In some cases, an operating system, portions of which are typically resident in memory 240 and executed by the processor(s) 220, functionally organizes the node/device by, inter alia, invoking network operations in support of software processors and/or services executing on the device. These software processors and/or services may comprise a channel utilization adjustment process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, ne technology that can be used for location services is Bluetooth Low Energy (BLE) that was specifically designed to consume less energy than other wireless technologies. Despite this advantage, BLE beacons also operate in the congested 2.4 GHz band. Moreover, the channels used by BLE are industrial, scientific, and medical (ISM) channels, meaning that BLE tags compete with multiple systems, including Wi-Fi, as soon as they establish a connection. Prior to establishing a connection, BLE uses three "Wi-Fi friendly" advertisement channels, to avoid collision with Wi-Fi channels. With such limited channel availability for advertisements, as little as five BLE tags are enough to create collisions with one another. When used for purposes of location services in high density environments, which may include upwards of tens of thousands of BLE tags, this all but guarantees a very high rate of collisions, making it all but impossible for the location services to track every tag.

BLE-Based Location Services in High Density Deployments

The techniques herein introduce a dynamic, multi-dimensional analysis approach to adjusting transmission patterns of mobile BLE devices in a given RF environment. In some aspects, the techniques herein allow for better tracking of more devices as the RF pressure increases (e.g., in cases of reduced airtime). In addition, the techniques herein also introduce a balancing approach to increasing and decreasing tolerance to the pressure of competing flows, thus affording the location services high tracking capabilities, even when the RF conditions change.

Specifically, according to one or more embodiments of the disclosure as described in detail below, a device obtains telemetry data indicative of channel usage by a plurality of Bluetooth Low Energy (BLE) tags. The device also obtains tag characteristic data indicative of one or more characteristics of the BLE tags. The device determines that usage of a particular channel by the BLE tags exceeds a predefined threshold, based on the obtained telemetry data. The device selects a subset of the plurality of BLE tags, based on their one or more characteristics indicated by the obtained tag characteristic data. The device instructs, for each of the selected subset of BLE tags, the selected BLE tag to increase an interval of time between BLE advertisements sent by the selected BLE tag.

Illustratively, the techniques described herein may be performed by hardware, software, and/or firmware, such as in accordance with the channel usage adjustment process 248, which may include computer executable instructions executed by the processor 220 (or independent processor of interfaces 210) to perform functions relating to the techniques described herein.

Figure 3:
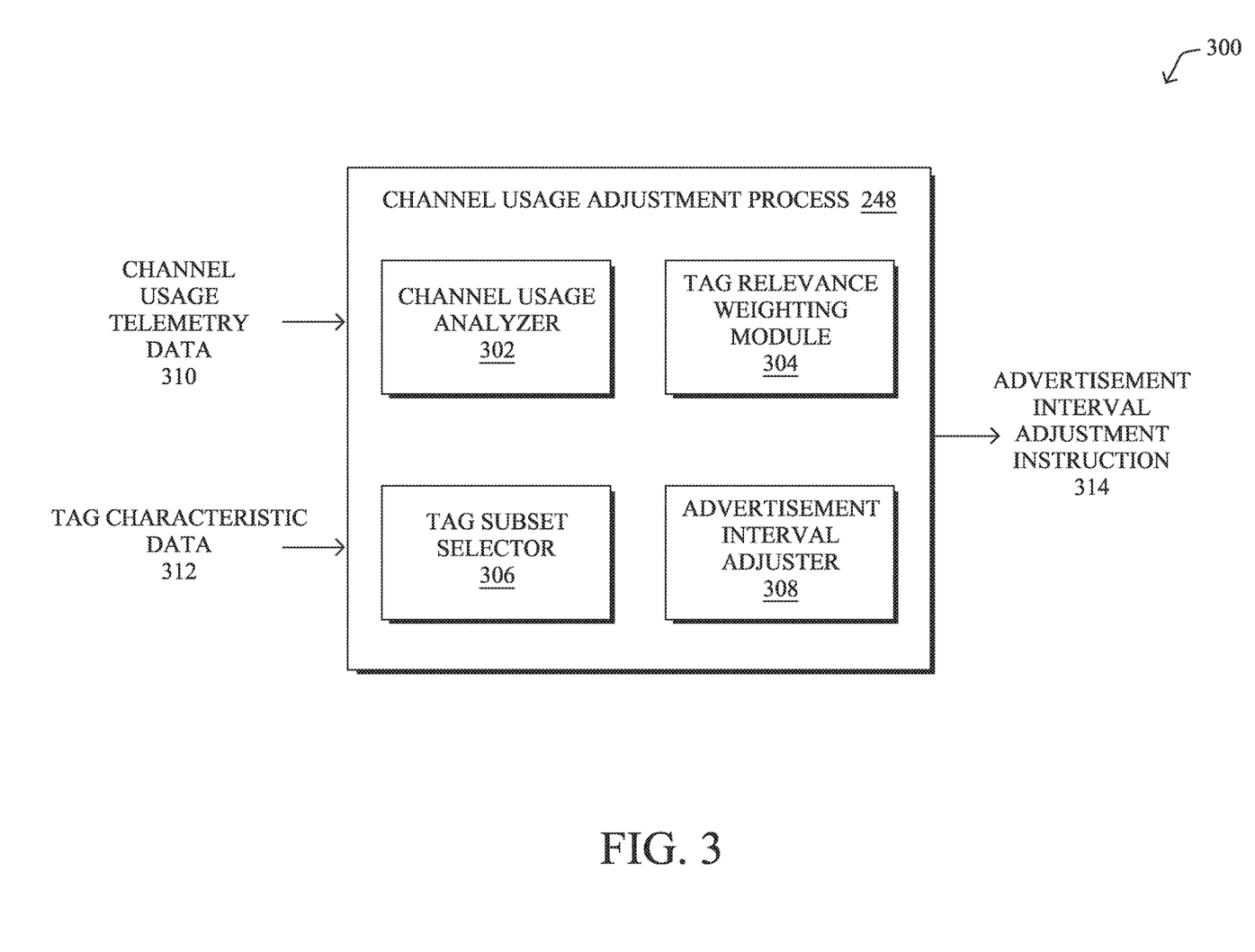
FIG. 3 illustrates an example architecture for adjusting channel usage by Bluetooth Low Energy (BLE) tags.

Operationally, FIG. 3 illustrates an example architecture 300 for adjusting channel usage by Bluetooth Low Energy (BLE) tags, according to various embodiments. At the core of architecture 300 is channel usage adjustment process 248 which may comprise any or all of the following components: a channel usage analyzer 302, a tag relevance weighting module 304, a tag subset selector 306, and/or an advertisement interval adjuster 308. In addition, some or all of components 302-308 may be implemented as part of a location service, such as location service 112 shown in FIG. 1. The functionalities of components 302-308 may also be combined, omitted, or implemented as part of other processes, as desired.

As would be appreciated, BLE-based tag messaging includes two distinct types of messages: 1.) advertisement messages sent by a BLE tag that are received by any other compatible device within range and 2.) data messages whereby the BLE tag exchanges data with a specific receiver. During operation, advertisement messages, also referred to as beacons, can be used for purposes of locating a particular BLE tag. In addition, advertisement messages can be used to establish a connection between a BLE tag and another device, after which data messaging may commence. As such, architecture 300 may consider both dimensions, advertisement and data exchange messages, when optimizing BLE communications within a high density environment.

As shown, channel usage adjustment process 248 may obtain channel usage telemetry data 310. In general, channel usage telemetry data 310 may be indicative of the usage of the various wireless channels by the BLE tags within the environment (e.g., which channels were used and when). For example, channel usage adjustment process 248 may receive channel usage telemetry data 310 for BLE advertisement messages from any number of APs within the network. Similarly, channel usage adjustment process 248 may receive channel usage telemetry data 310 regarding usage of the overall band from a mechanism such as CleanAir or Radio Resource Management (RRM) by Cisco Systems, Inc. Of course, other telemetry collection mechanisms can also be used from other vendors, to collect channel usage telemetry data 410. As a further extension, channel usage telemetry from Wi-Fi can further be used to enhance channel usage telemetry data 310.

In BLE, every advertising tag sends an advertising message once every advertising period, also referred to as its beacon interval or advertising interval, which can be configured per BLE tag. Typical advertising periods in BLE are between 100 ms and 1 s. Note, however, that Bluetooth 4.2 part E 7.8.5 allows for advertising intervals ranging from 20 ms to 10.24 s. Shorter advertising periods can lead to faster data access, such as when a data connection is expected. For purposes of device location tracking, shorter advertising periods lead to more accurate location estimates. However, shorter periods also introduce more contentions into the shared wireless channels, which can ultimately increase access delay in some environments.

When data messaging occurs, BLE tags usually leverage one of the generic attributes (GATT) profiles defined by the Bluetooth Special Interest Group (SIG), with the exception of when BLE tags form a mesh network. However, this sub-mode is a special case and can be ignored for purposes of the techniques herein. A common approach used by all GATT profiles is that the client tag and server or AP first establish a connection, then exchange data. In this choreography, the client sends a GATT command/request, and expects an answer. A configurable timer can be set to determine whether the exchange was successful (e.g., if the GATT command was not answered within 3 seconds, the command is labeled as failed). When failure occurs, a configurable amount of retries are possible. For each retry, the client tag adds a random contention waiting period (to avoid subsequent collisions). This waiting period is often hard coded.

Such advertising and data messaging timing information, as well as the channel(s) used, can be captured as channel usage telemetry data 310 for input to channel usage adjustment process 248. In turn, channel usage analyzer 302 may assess channel usage telemetry data 310 to assess the channel usage pressure in the network. More specifically, channel usage analyzer 302 may quantify the channel usage pressure as an advertisement and data exchange channel pressure vector. This vector quantifies the channel utilization on all the advertisement channels (e.g., channels 37, 38 and 39 of the 2.4 GHz band) and the overall band, as data exchange uses an FHSS-based mechanism.

In various embodiments, channel usage analyzer 302 may use its computed channel usage pressure vector to determine that usage of one of the channels exceeds a predefined threshold. In some cases, the usage threshold may be a configurable parameter of channel usage adjustment process 248, such as via a user interface. For example, channel usage analyzer 302 may determine that usage of channel 38 is too high and, consequently, is impinging on the ability of the location service to locate BLE tags in the environment. In another example, channel usage analyzer 302 may determine that usage of one of the data messaging channels is too high, potentially causing important data to be lost, such as sensor readings.

In cases in which channel usage analyzer 302 determines that there is too much channel usage pressure, tag subset selector 306 may select a subset of the BLE tags in the environment for adjustment, based on tag relevance weightings assigned to the tags by tag relevance weighting module 304. More specifically, channel usage adjustment process 248 may allow an administrator to specify, via a user interface, classes of BLE tags along any number of dimensions/tag characteristics.

As shown, tag relevance weighting module 304 may compute a relevance weight for each of the BLE tags in the environment based on tag characteristic data 312 obtained by channel usage adjustment module 248. In various embodiments, tag characteristic data 312 may be indicative of any or all of the following characteristics:

Tag mobility—Data 312 may indicate whether the BLE tag is static or moving and, if so, to what extent.

Tag user/owner—Data 312 may also indicate the specific person or category of person associated with the BLE tag. For example, data 312 may distinguish between patrons and personnel of an establishment.

Device type—Data 312 may further indicate the specific device type associated with the BLE tag. For example, a mobile phone may function as a BLE tag and data 312 may indicate that the tag is associated with a mobile phone device type or even a more specific type, such as the make or model of phone. In cases in which the BLE tag is attached to another device, data 312 could also indicate the type of device to which the BLE tag is attached.

Traffic—Data 312 may also indicate the type of data traffic associated with the BLE tag. For example, data 312 may indicate that a particular BLE tag sends temperature readings via BLE data messaging.

As would be appreciated, channel usage adjustment process 248 may obtain tag characteristic data 312 from any number of sources. For example, specific BLE tags may be identified via user interface as being associated with certain device types, as in the case of asset tracking. In other examples, a traffic analytics service may provide tag characteristic data 312 to channel usage adjustment process 248 for purposes of computing tag relevance weights.

A key function of tag relevance weighting module 304 is the ability to prioritize certain BLE tags over others, based on their relevance to the network deployment. For example, in a fitness club, both patrons and personnel may need to be located, and both patrons and personnel may exchange BLE data (e.g., biometric data exchanged between BLE-enabled devices of patrons and sports equipment, personnel work-related data, such as visits to a towel area, etc.). The configurability of the tag relevance weightings by tag relevance weighting module 304 thus allows the administrator of the network to control which of these two objectives, enhancing the experiences of patrons and tracking the movement of personnel, is more important.

Similarly, tag relevance weighting module 304 may also take into account the mobility of a given BLE tag. For example, if a certain BLE tag is very stationary, its relevancy weighting may be lowered, as frequent determinations of its location are not necessary.

Based on the tag relevance weightings computed by tag relevance weighting module 304, tag subset selector 306 may select a subset of the BLE tags in the environment to reduce their channel utilizations. In some embodiments, tag subset selector 306 may also take into account the current channel usage of the BLE tags. For example, continuing the example of a fitness club, a particular temperature sensor may use BLE to report temperature readings every five seconds and have a moderate relevance rating. However, reporting the temperature readings at such a high frequency may not be critical and other BLE tags in the network may have higher relevance ratings, making it a candidate for selection by tag subset selector 306.

In turn, advertisement interval adjuster 308 may send an advertisement interval adjustment instruction 314, either directly or indirectly, to a BLE tag selected by tag subset selector 306. In general, advertisement interval adjustment instruction 314 may cause the recipient BLE tag to increase its interval of time between sending BLE advertisements. For example, in the case of a temperature sensor reporting a temperature reading every five seconds, advertisement interval adjustment instruction 314 may instruct the sensor to only report every sixty seconds, accept a longer success timer (e.g. wait 10 seconds instead of 3 before deciding that a communication failed), and/or accept a shorter retry rate (e.g., re-attempt once instead of twice). Of course, if the channel usage pressure drops over time to an acceptable level, channel usage adjustment process 248 may send out further instructions to any or all of the selected BLE tags, to reinstate their original settings.

Thus, with architecture 300, as the channel usage pressure increases in the deployment, the advertisement intervals of BLE tags in the network may be gradually increased and in a way that first selects those devices of lowest relevance to the deployment. As advertisement interval also affects data exchanges, as the BLE tag and receiver will take longer to discover each other, channel usage adjustment process 248 may leverage a a tag-count to CU pressure vector, to artificially increase the acceptable loss ratio for devices with data exchanges and lower relevance.

Figure 4:
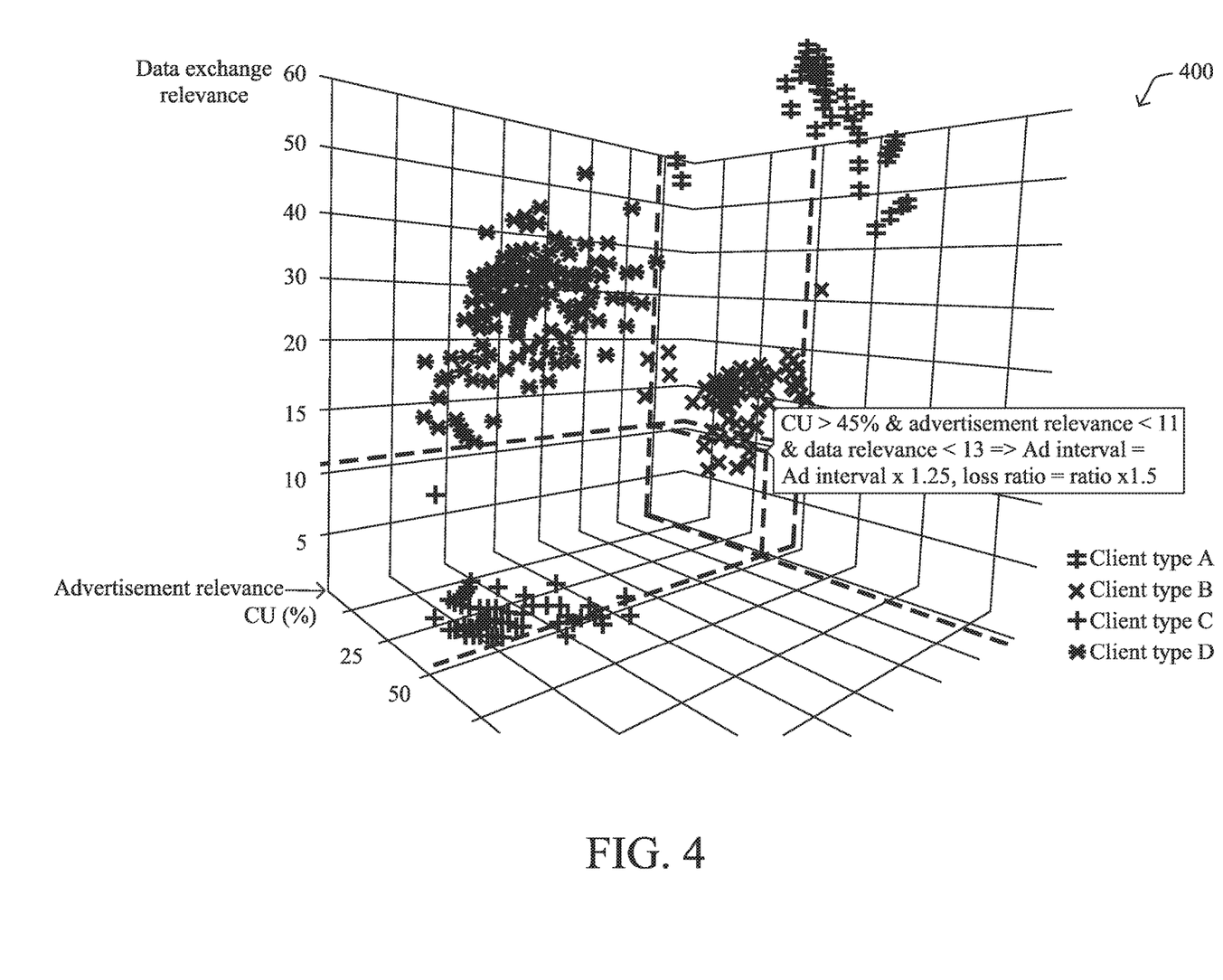
FIG. 4 illustrates an example plot of tag/client types.

FIG. 4 illustrates an example plot 400 of different tag/client types in terms of channel usage (CU) percentage versus data exchange relevance and advertisement relevance. As shown, the overall relevance weighting of a given tag may be represented as a multidimensional manner, with the relevance of each tag/client type (e.g., based on their associated device type and/or owner) having both a data exchange component and an advertisement relevance. As shown, assume that a subset of the tags, those of client type B, are selected for advertisement interval adjustment, based on the channel utilization and relevancies. In such a case, the system may increase their advertisement intervals by 1.25 times and their loss ratios by 1.5 times.

Figure 5A:
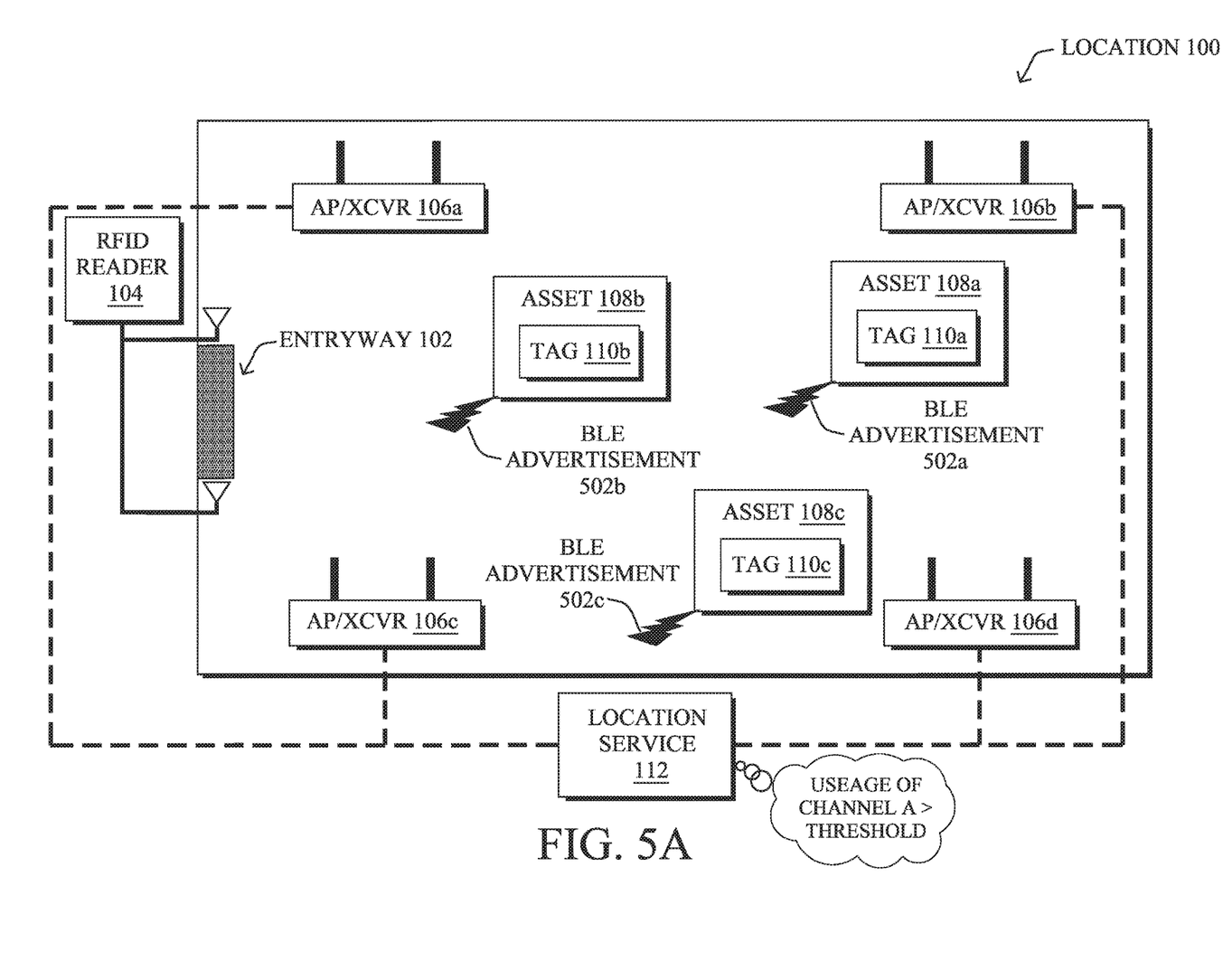
FIGS. 5A-5B illustrate an example of instructing a tag to send BLE advertisements less frequently.
Figure 5B:
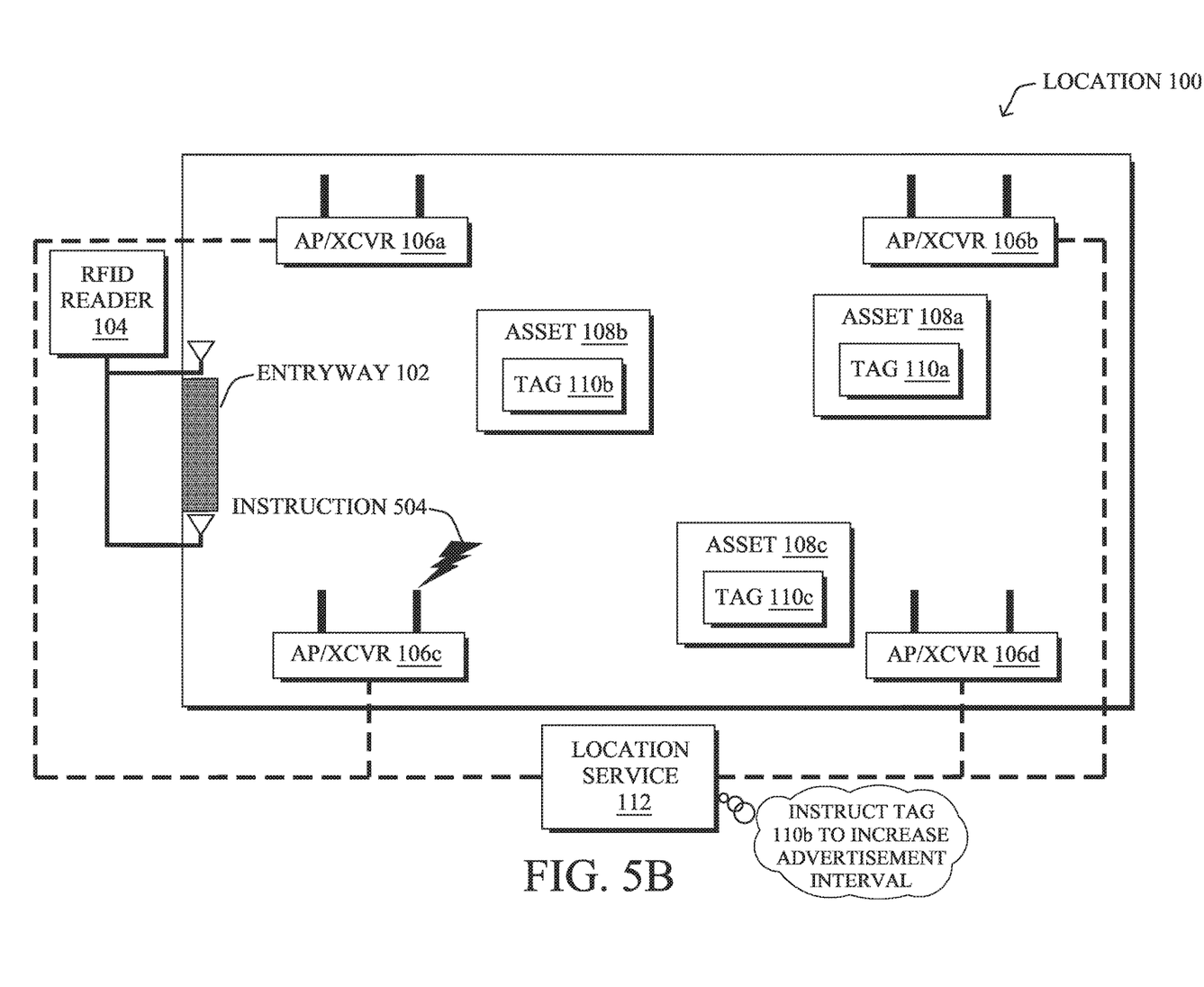

FIGS. 5A-5B illustrate an example of instructing a tag to send BLE advertisements less frequently, as described in greater detail above. Continuing the example of FIG. 1, assume that there are a plurality of BLE tags 110 at location 100, tags 110a-110c. As would be appreciated, this is a simplified example for illustrative purposes only and a real-world deployment may have hundreds, or even thousands, or tags.

As shown in FIG. 5A, assume that each of tags 110a-110c sends out BLE advertisements 502a-502c on the same channel, thus causing collisions. Because of these collisions, location service 112 may not be able to properly estimate the locations of certain tags 110. Using the techniques herein, location service 112 may determine that the usage of advertisement channel A exceeds some predefined threshold. In turn, location service 112 may assign relevancy weightings to each of tags 110a-110c to prioritize them and select tag 110b for adjustment, based in part on its associated weighting. Based on this selection, as shown in FIG. 5B, location service 112 may send an instruction 504, via AP/XCVR 106c, to tag 110b that causes tag 110b to send out BLE advertisements less frequently. By doing so, there is less of a chance of collision with those of tags 110a and 110c, improving the overall function of the network.

Figure 6:
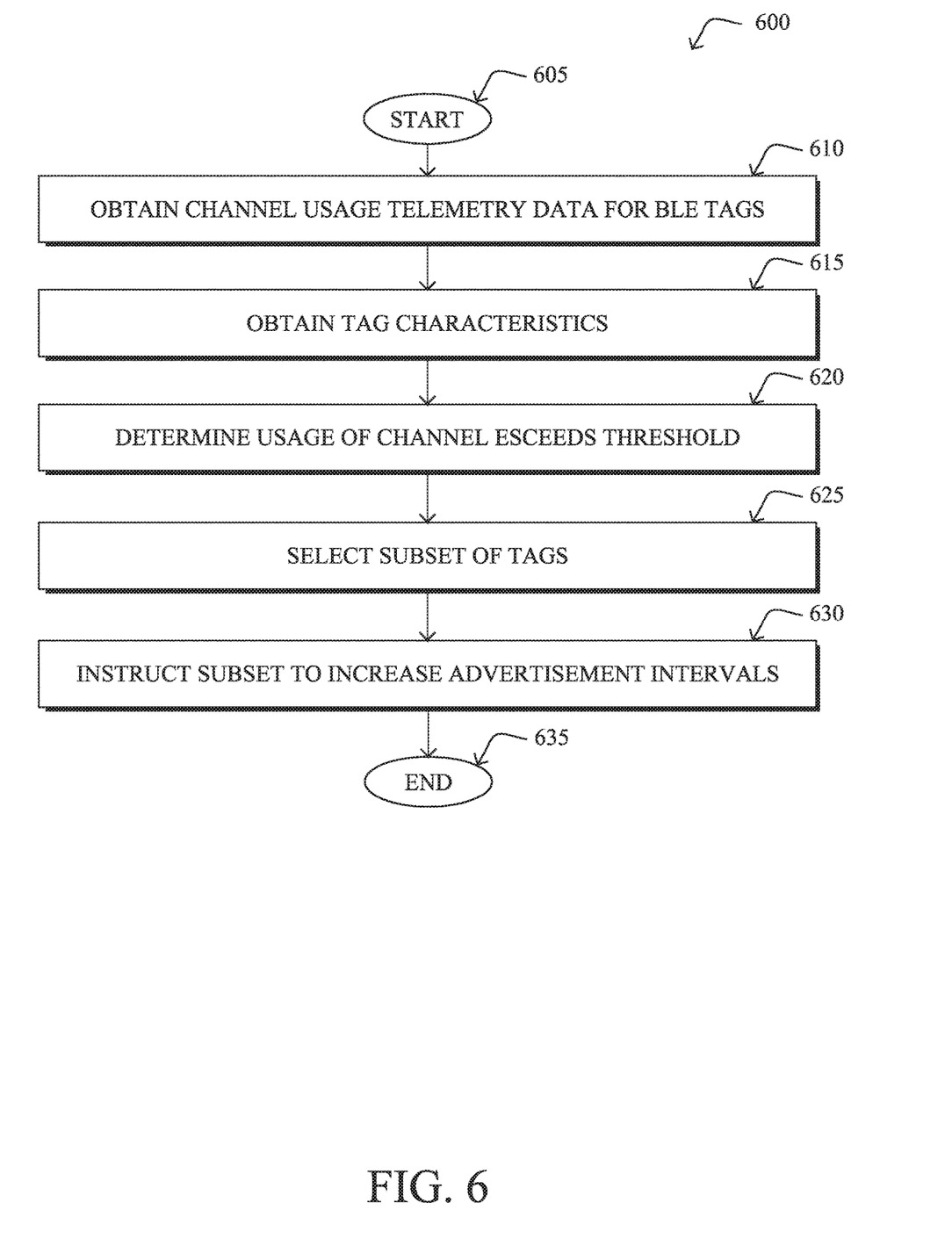
FIG. 6 illustrates an example simplified procedure for adjusting channel usage in a network.

FIG. 6 illustrates an example simplified procedure for adjusting channel usage in a network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may obtain telemetry data indicative of channel usage by a plurality of Bluetooth Low Energy (BLE) tags. For example, the device may receive the telemetry data from any number of APs located in the network. In general, the telemetry data may be indicative of the usage of the BLE advertisement channels (e.g., channels 37-39 in the 2.4 GHz spectrum) and, potentially, the use of the BLE data channels by the tags, as well.

At step 615, as detailed above, the device may obtain tag characteristic data indicative of one or more characteristics of the BLE tags. In various embodiments, the tag characteristic data may indicate the device types associated with the tags, the owners/users associated with the tags, the mobility of the tags, and/or the types of traffic associated with the tags.

At step 620, the device may determine that usage of a particular channel by the BLE tags exceeds a predefined threshold, based on the obtained telemetry data. For example, the device may determine that too many of the BLE tags are using one of the BLE advertisement channels, this impeding location estimates made by a location service.

At step 625, as detailed above, the device may select a subset of the plurality of BLE tags, based on their one or more characteristics indicated by the obtained tag characteristic data. In some embodiments, the device may do so by assigning relevancy weightings to each of the plurality of BLE tags, based on their characteristics. For example, the device may determine that a stationary tag that is associated with a non-critical device type may be of low relevance to the deployment and could still function within acceptable levels with less frequent BLE advertisements. In turn, the device may include the tag with the low relevancy weighting in the subset for advertisement interval adjustment.

At step 630, the device may instruct, for each of the selected subset of BLE tags, the selected BLE tag to increase an interval of time between BLE advertisements sent by the selected BLE tag. In other words, the device may instruct the subset of BLE tags to send out BLE advertisements less frequently. This can be done, for example, in conjunction with adjusting the success timer of the tag and/or decreasing the retry rate of the tag.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the optimization of BLE messaging in a network by prioritizing certain BLE tags over others. In some aspects, the advertisement intervals of the BLE tags can be adjusted, so as to cause lower relevancy tags to transmit less frequently, thereby reducing channel usage and the potential for collisions.

While there have been shown and described illustrative embodiments that provide for BLE-based location services in high density deployments, it is to be understood that various other adaptations and modifications may be made within the spirit and scope of the embodiments herein. For example, while certain embodiments are described herein with respect to using certain protocols, such as BLE, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, telemetry data indicative of channel usage by a plurality of Bluetooth Low Energy (BLE) tags;
   obtaining, by the device, tag characteristic data indicative of one or more characteristics of the BLE tags;
   determining, by the device, that usage of a particular channel by the BLE tags exceeds a predefined threshold, based on the obtained telemetry data;
   selecting, by the device, a subset of the plurality of BLE tags, based on their one or more characteristics indicated by the obtained tag characteristic data; and
   instructing, by the device and for each of the selected subset of BLE tags, the selected BLE tag to increase an interval of time between BLE advertisements sent by the selected BLE tag.

2. The method as in claim 1, wherein obtaining the telemetry data indicative of channel usage by the plurality of BLE tags comprises:
   receiving the telemetry data from one or more wireless access points (APs).

3. The method as in claim 1, wherein the particular channel comprises channel 37, 38, or 39 of the 2.4 GHz band.

4. The method as in claim 1, wherein selecting the subset of the plurality of BLE tags comprises:
   assigning a relevance weighting to each of the plurality of BLE tags, based on the one or more characteristics of that BLE tag; and
   selecting the BLE tags with the lowest relevance weightings as the subset.

5. The method as in claim 4, wherein the one or more characteristics of a BLE tag is indicative of mobility of that BLE tag, and wherein assigning a relevance weighting to each of the plurality of BLE tags comprises:
   assigning a lower relevance weighting to a static BLE tag than that of a mobile BLE tag.

6. The method as in claim 4, wherein the one or more characteristics of a BLE tag is indicative of a type of data traffic or user associated with that BLE tag.

7. The method as in claim 1, wherein the particular channel is a BLE data channel.

8. The method as in claim 1, further comprising:
   making, by the device, a determination that usage of the particular channel has not exceeded the predefined threshold for a period of time; and
   instructing, by the device, at least one of the subset of BLE tags to decrease its interval of time between BLE advertisements, based on the determination.

9. The method as in claim 1, wherein instructing, for each of the selected subset of BLE tags, the selected BLE tag to increase an interval of time between BLE advertisements sent by the selected BLE tag comprises:
  determining an acceptable loss ratio for the selected BLE tag.

10. An apparatus, comprising:
  one or more network interfaces to communicate with a network;
  a processor coupled to the network interfaces and configured to execute one or more processes; and
  a memory configured to store a process executable by the processor, the process when executed configured to:
    obtain telemetry data indicative of channel usage by a plurality of Bluetooth Low Energy (BLE) tags;
    obtain tag characteristic data indicative of one or more characteristics of the BLE tags;
    determine that usage of a particular channel by the BLE tags exceeds a predefined threshold, based on the obtained telemetry data;
    select a subset of the plurality of BLE tags, based on their one or more characteristics indicated by the obtained tag characteristic data; and
    instruct, for each of the selected subset of BLE tags, the selected BLE tag to increase an interval of time between BLE advertisements sent by the selected BLE tag.

11. The apparatus as in claim 10, wherein the apparatus obtains the telemetry data indicative of channel usage by the plurality of BLE tags by:
  receiving the telemetry data from one or more wireless access points (APs).

12. The apparatus as in claim 10, wherein the process when executed is further configured to:
  instruct one of the selected BLE tags to decrease its retry rate or increase its success timer.

13. The apparatus as in claim 10, wherein the apparatus selects the subset of the plurality of BLE tags by:
  assigning a relevance weighting to each of the plurality of BLE tags, based on the one or more characteristics of that BLE tag; and
  selecting the BLE tags with the lowest relevance weightings as the subset.

14. The apparatus as in claim 13, wherein the one or more characteristics of a BLE tag is indicative of mobility of that BLE tag, and wherein the apparatus assigns a relevance weighting to each of the plurality of BLE tags by:
  assigning a lower relevance weighting to a static BLE tag than that of a mobile BLE tag.

15. The apparatus as in claim 13, wherein the one or more characteristics of a BLE tag is indicative of a type of data traffic or user associated with that BLE tag.

16. The apparatus as in claim 13, wherein the particular channel is a BLE data channel.

17. The apparatus as in claim 10, wherein the process when executed is further configured to:
  make a determination that usage of the particular channel has not exceeded the predefined threshold for a period of time; and
  instruct at least one of the subset of BLE tags to decrease its interval of time between BLE advertisements, based on the determination.

18. The apparatus as in claim 10, wherein the apparatus instructs, for each of the selected subset of BLE tags, the selected BLE tag to increase an interval of time between BLE advertisements sent by the selected BLE tag by:
  determining an acceptable loss ratio for the selected BLE tag.

19. A tangible, non-transitory, computer-readable medium storing program instructions that cause a device in a network to execute a process comprising:
  obtaining, by the device, telemetry data indicative of channel usage by a plurality of Bluetooth Low Energy (BLE) tags;
  obtaining, by the device, tag characteristic data indicative of one or more characteristics of the BLE tags;
  determining, by the device, that usage of a particular channel by the BLE tags exceeds a predefined threshold, based on the obtained telemetry data;
  selecting, by the device, a subset of the plurality of BLE tags, based on their one or more characteristics indicated by the obtained tag characteristic data; and
  instructing, by the device and for each of the selected subset of BLE tags, the selected BLE tag to increase an interval of time between BLE advertisements sent by the selected BLE tag.

20. The computer-readable medium as in claim 19, wherein selecting the subset of the plurality of BLE tags comprises:
  assigning a relevance weighting to each of the plurality of BLE tags, based on the one or more characteristics of that BLE tag; and
  selecting the BLE tags with the lowest relevance weightings as the subset.

* * * * *